(12) United States Patent
Chatterjee et al.

(10) Patent No.: US 8,691,467 B2
(45) Date of Patent: Apr. 8, 2014

(54) METALLIC STRUCTURES FOR SOLID OXIDE FUEL CELLS

(75) Inventors: Dilip Kumar Chatterjee, Rochester, NY (US); Jeffrey Earl Cortright, Corning, NY (US); Pamela Arlene Maurey, Savona, NY (US); Samir Biswas, Sayre, PA (US)

(73) Assignee: Corning Incorporated, Corning, NY (US)

( * ) Notice: Subject to any disclaimer, the term of this patent is extended or adjusted under 35 U.S.C. 154(b) by 1419 days.

(21) Appl. No.: 11/303,723

(22) Filed: Dec. 15, 2005

(65) Prior Publication Data

US 2007/0077481 A1   Apr. 5, 2007

Related U.S. Application Data

(60) Provisional application No. 60/722,573, filed on Sep. 30, 2005.

(51) Int. Cl.
*H01M 2/20* (2006.01)
*H01M 8/24* (2006.01)

(52) U.S. Cl.
USPC ........... 429/468; 429/465; 429/469; 429/507; 429/509

(58) Field of Classification Search
USPC .......................................................... 429/30
See application file for complete search history.

(56) References Cited

U.S. PATENT DOCUMENTS

| | | | | |
|---|---|---|---|---|
| 4,029,476 A * | 6/1977 | Knopp | ........................... | 428/676 |
| 5,733,682 A | 3/1998 | Quadakkers et al. | ......... | 429/210 |
| 5,776,624 A * | 7/1998 | Neutzler | ...................... | 429/437 |
| 6,623,881 B2 | 9/2003 | Badding et al. | .................. | 429/30 |
| 6,852,436 B2 | 2/2005 | Badding et al. | .................. | 429/32 |
| 2004/0043269 A1 * | 3/2004 | Taniguchi et al. | ............... | 429/30 |
| 2004/0076867 A1 * | 4/2004 | Day et al. | ......................... | 429/32 |
| 2004/0219423 A1 * | 11/2004 | Tunney et al. | ................. | 429/127 |
| 2007/0281175 A1 * | 12/2007 | Hoffmann et al. | ............. | 428/457 |

FOREIGN PATENT DOCUMENTS

| | | | |
|---|---|---|---|
| EP | 0446680 | 9/1991 | |
| EP | 0840388 | 5/1998 | |
| WO | WO2005018867 | * 3/2005 | ............. B23K 31/02 |

OTHER PUBLICATIONS

"Brazing of Metallic conductors onto ceramic plates in solid oxide fuel cells" Wilkenhoener, et al Journal of Materials Science Apr. 1, 2001, vol. 36 pp. 1775-1782.

* cited by examiner

*Primary Examiner* — Ula C Ruddock
*Assistant Examiner* — Archer Dudley
(74) *Attorney, Agent, or Firm* — Michael W. Russell

(57) ABSTRACT

A method and resulting device for metallic structures including interconnects and sealed frames for solid oxide fuel cells, particularly those with multi-cell electrolyte sheets, includes providing a high-temperature aluminum-containing surface-alumina-forming steel, forming an interconnect structure from the steel, removing any alumina layer from a surface portion of the interconnect where an electrical contact is to be formed, providing a structure having a surface portion with which electrical contact is to be made by the surface portion of the interconnect, and brazing the surface portion of the interconnect to the surface portion of the structure, and sealing fuel cell frames by brazing.

9 Claims, 4 Drawing Sheets

METALLIC STRUCTURES FOR SOLID OXIDE FUEL CELLS

CLAIM OF PRIORITY

This application claims the benefit of priority under 35 U.S.C. §119(e) of U.S. Provisional Application Ser. No. 60/722,573 filed on Sep. 30, 2005.

BACKGROUND OF THE INVENTION

1. Field of the Invention

The present invention relates generally to metallic structures for solid oxide fuel cells, and more specifically to metallic interconnects and metallic frames and metallic frame seals for solid oxide fuel cells.

2. Technical Background

In Solid Oxide Fuel Cells (SOFCs) a solid electrolyte with permeable anode and cathode disposed on either side is exposed to oxygen (normally in air) on the cathode side and fuel such as hydrogen gas or its precursor on the anode side. Typical electrolyte materials are oxide-ion conducting. Oxygen, reduced to oxide ions at the cathode, migrates through the electrolyte to the anode to react with the fuel. The excess charge thus built up across the anode-cathode pair provides a source of electrical current. As open-circuit voltage generated across a single cathode/anode pair is in the neighborhood of 1 volt, many cathode/anode pairs are generally interconnected in series to provide industrially useful voltage and power levels. If interconnect resistivity is too high, however, a major fraction of the power generated gets converted to heat energy and is not available as electrical output.

In addition to low initial resistivity, choice of interconnect materials should be based on oxidation characteristics such that prolonged high temperature exposure of the material provides a protective oxide layer which does not grow rapidly over time and does not increase resistivity. Prolonged high temperature exposure of some metallic materials also leads to evaporation of constituent elements. This not only contributes to degradation of the interconnect materials, but also tends to contaminate the other functional components of the cell, decreasing cell performance. Hence it is also important that interconnect material is stable at operating temperatures.

SOFC interconnects thus desirably possess several properties: long-term chemical stability at high temperatures in both reducing and oxidizing environments; high electronic and low ionic conductivity in these same conditions; low contact resistance; thermal expansion closely matching that of related fuel cell components; mechanical durability through repeated temperature cycling, and of course, relatively low cost. Frame or cell wall materials for solid oxide fuel cells desirably share many of the same properties, but without a requirement of high electronic conductivity, and with a premium on thermal expansion match to the electrolyte.

Ceramic and noble-metal interconnect materials are usually prohibitively expensive for mass-produced applications. Commercially available high-chromium ferritic steels and variations thereof are the principal non-noble metallic materials that have been proposed and investigated for achieving the desired combination of properties. A chromium oxide layer forms on outer surfaces of these alloys, protecting the bulk material. The layer provides reasonably low resistivity, and some resistance to oxidizing and reducing environments. At typical fuel cell operating temperatures, however, formation of volatile chromium oxides or oxy-hydroxides or other migratory species tends to contaminate the cell, reducing the performance of the cathode and other components.

Ferritic steels with high aluminum content, that form alumina layers, while generally even more chemically stable because of the very slow growth and great durability of alumina, have typically been avoided because of the high resistivity of the alumina layer. In one exception to the general avoidance of alumina-forming alloys for fuel cell interconnect materials, ion implantation has been used as a means of increasing the conductivity of such protective alumina layers on ferritic steels that form them. Less expensive alternatives are desirable.

SUMMARY OF THE INVENTION

One aspect of the present invention relates to a method for forming electrical interconnects for solid oxide fuel cells including the steps of providing a high-temperature aluminum-containing surface-alumina-forming steel, forming an interconnect structure from the steel, removing any alumina layer from a surface portion of the interconnect where an electrical contact is to be formed, providing a structure having a surface portion with which electrical contact is to be made by the surface portion of the interconnect, and brazing the surface portion of the interconnect to the surface portion of the structure. This method aspect of the invention method may be employed to join one interconnect structure (one structure of high-temperature aluminum-containing surface-alumina-forming steel) to another, or to a bus bar or current collector, or directly to an electrode or electrolyte surface, such as to the surface of a zirconia-based electrolyte material.

The steel employed in the method is desirably a chromium-containing ferritic steel having in the range of 0.1 to 10%, aluminum, more desirably in the range of 0.1 to 7% aluminum, and most desirably in the range 3 to 6% aluminum. The braze filler material employed is desirably an active braze material, and it may desirably be used (brazed) under vacuum.

Another aspect of the present invention relates to an interconnect for a solid oxide fuel cell, the interconnect comprising a high-temperature aluminum-containing surface-alumina-forming steel structure, a second structure to which the high-temperature aluminum-containing surface-alumina-forming steel structure is electrically connected, and a brazed joint between the high-temperature aluminum-containing surface-alumina-forming steel structure and the second structure. The second structure may also be a high-temperature aluminum-containing surface-alumina-forming steel structure, or it may be a current collector bus bar, such as a silver palladium bus bar, or it may be an electrode or electrolyte material.

In yet another aspect, the invention relates to a fuel cell device comprising fuel cell modules and interconnect structures electrically interconnecting the fuel cell modules, where the interconnect structures are formed of (1) a high-temperature aluminum-containing surface-alumina-forming steel, (2) a structure to which the a high-temperature aluminum-containing surface-alumina-forming steel structure is electrically connected, and (3) a brazed joint between the a high-temperature aluminum-containing surface-alumina-forming steel structure and the structure.

Surprisingly (given the general avoidance of alumina-forming steels for this application, or the perceived necessity of ion-implantation-doping to improve conductivity of the alumina layers), the present inventors have discovered that relatively low-resistivity contacts may be formed, and maintained through temperature cycling in typical fuel-cell environments, by use of the methods and materials of the present invention, without specialized doping of the outer alumina layer. The present invention is particularly useful within fuel cells employing electrolyte sheets having multiple electrolyte-supported cells thereon, but may find beneficial application in other architectures.

In yet another aspect of the present invention, fuel cell modules including metal frames sealed to electrolyte sheets are formed by providing a metal frame formed of a high-temperature-resistant metal and sealing an electrolyte sheet to the frame by brazing using an active braze filler material, resulting in a gas-tight seal capable of withstanding thermal cycling.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

Figure 1:
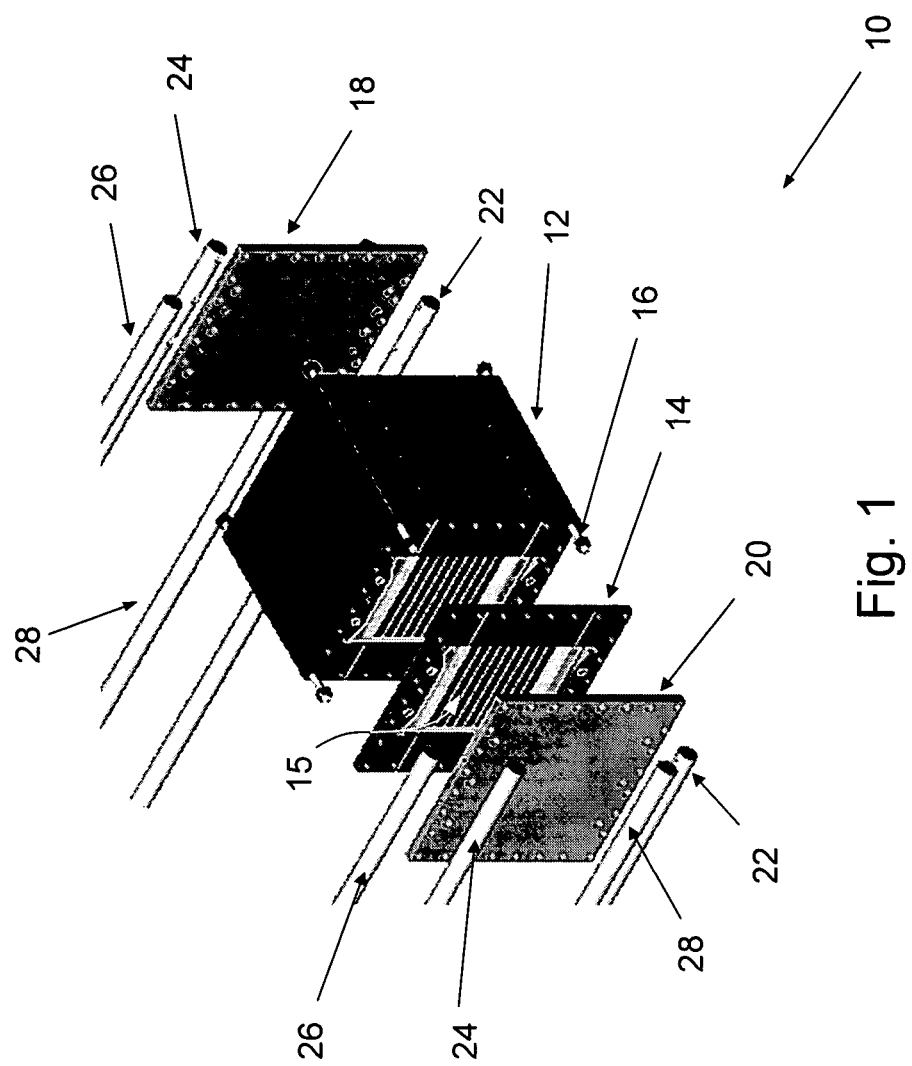
FIG. 1 is a partially exploded perspective view of one embodiment of a multiple-cell solid oxide fuel cell device 10 in which the present invention is employed.

One example of a planar fuel cell architecture in which the present invention finds beneficial application is shown in partially exploded perspective view in FIG. 1. In the multiple cell device 10 of FIG. 1 a fuel cell stack 12 is built up of individual electrolyte modules 14, each including, in this example, an electrolyte sheet 15 with multiple anode/cathode pairs formed thereon, i.e., a multi-cell electrolyte sheet 15. (For further description of such electrolyte sheets, which allow series or parallel or combination interconnection of multiple cells on a single sheet, see U.S. Pat. Nos. 6,623,881 and 6,852,436, both assigned to the assignee of the present application. Although multi-cell sheets are desirable, typical single-celled electrolyte sheets may also benefit from the present invention.) The stack 12 is provided with end plates 18 and 20 and held together with through bolts 16. The unit is also provided with fuel and air supply tubes 22 and 24, and fuel exhaust tubes and air exhaust tubes 26 and 28.

Figure 2:
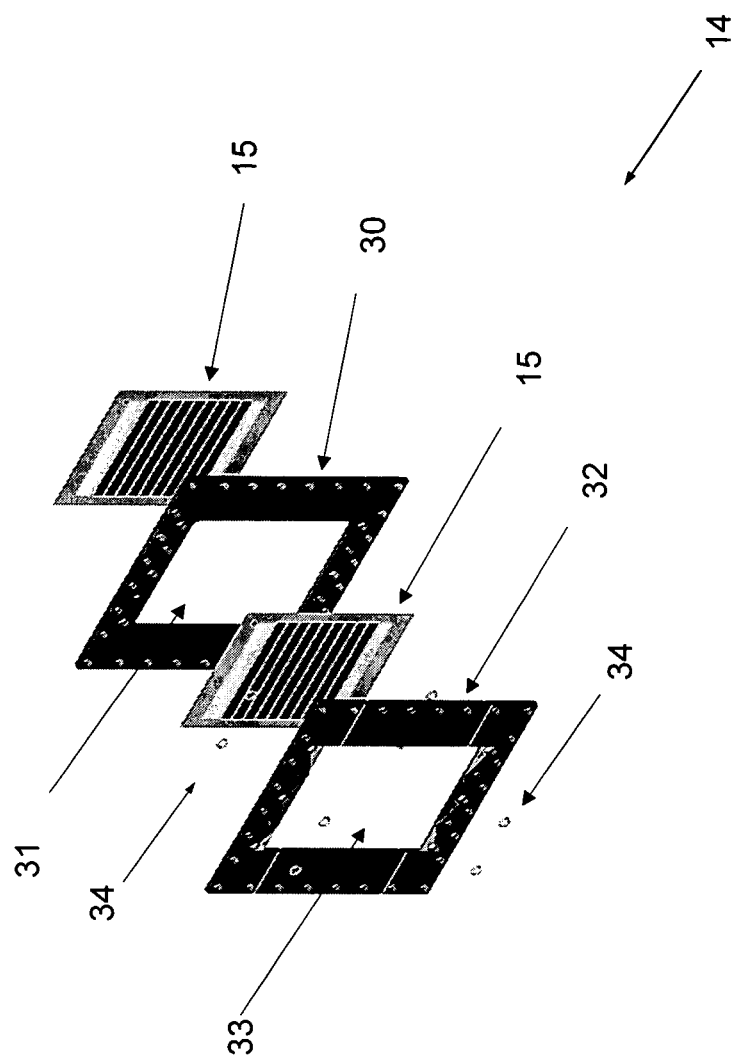
FIG. 2 is an exploded perspective view of an electrolyte module 14 of the device 10 of FIG. 1.

FIG. 2 is an exploded perspective view of an electrolyte module 14 of the type shown in FIG. 1. In FIG. 2, two multi-cell electrolyte sheets 15 are shown positioned around a fuel frame 30, with each sheet 15 having the anode surface thereof facing toward the fuel frame 30. When assembled, the sheets 15 and the fuel frame 30 enclose a fuel chamber within the space 31 defined by the fuel frame 30. An air frame 32, when it is assembled into the module 14 and the module into a stack 12 of the type shown in FIG. 1, similarly encloses an air chamber in the space 33 defined by the airframe and either two associated sheets 15 (only one of which is shown in FIG. 2) or the one sheet 15 and an end plate 18 as in FIG. 1. Fuel and air supply and exhaust manifolds are defined by through passages in the frames 30 and 34, and are sealed with various sealing washers 34.

Figure 3:
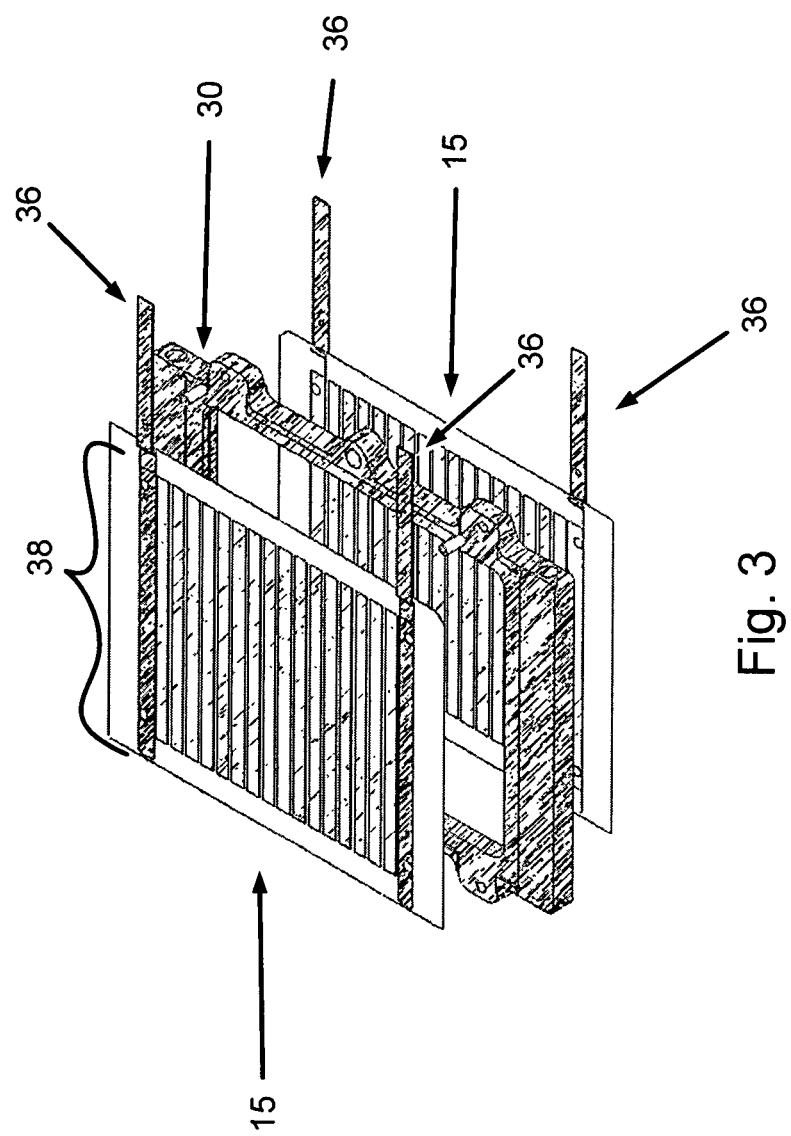
FIG. 3 is an exploded perspective view of an embodiment of a portion of the module 14 of FIG. 2.

FIG. 3 is an exploded perspective view, in close up, of two electrolyte sheets 15 and an associated fuel frame 30, of slightly different configuration but essentially similar function to that of FIGS. 1 and 2. Interconnects 36 are provided to allow electrical interconnection of the sheets 15, typically in series but alternatively, if desired for a particular application, in parallel. Interconnects 36 are joined via a braze joint to the associated electrolyte sheet directly or to a current collector or bus bar (obscured in the figure) positioned on the electrolyte sheet at area 38 in the embodiment shown in the figure.

According to the present invention, interconnects 36 are formed of a surface-alumina-forming high-temperature steel, desirably a ferritic steel with aluminum content in the range of about 0.1 to 10%, desirably in the range of about 0.1 to 7%, and most desirably in the range of about 3-6%, materials sometimes characterized as iron-chrome-aluminum alloys. Materials tested and producing beneficial results as set forth in the examples below include AluchromY (22% Cr, 5.3% Al, none or trace only of Si, Mn, Cu, C, Ti, Mi, Mo, W, balance Fe) and Aluchrom YHf (0-0.30 Ni, 19.0-21.0 Cr, 0-0.05 C, 0-0.50 Mn, 0-0.50 Si, 5.5-6.0 Al, 0-0.07 Zr, 0-0.1 Y, 0-0.1 Hf, balance Fe) (both available from Krupp VDM, Werdohl, Germany).

Less important than the exact percentages of components, of course, is the behavior of the alloy under the conditions present in solid oxide fuel cell devices, namely, that it be able to form and maintain under those conditions an essentially impervious and stable or extremely slow growing outer protective layer comprising alumina, typically over an underlying chromium oxide layer.

The alloy of the interconnects 36 may also desirably include small amounts of reactive elements, such as yttrium (Y) and/or hafnium (Hf) as may be present in Aluchrom YHf, for example, which may improve the adherence of the alumina layer.

Further according to the present invention, relatively low resistivity of the interconnects 36 is provided and preserved, despite the growth and maintenance on the interconnect of an alumina outer layer. This is achieved simply by (1) removing the alumina layer from areas such as area 38 (an interconnect-electrolyte or interconnect-current collector interface) and any area where adjacent interconnects 36 are to be bonded to each other, and then (2) bonding the interconnect-electrolyte, interconnect-current collector, or interconnect-interconnect interface using an appropriate active brazing compound, desirably under vacuum, but optionally under inert atmosphere. Following this method, resistivity of the bulk interconnect material is unchanged through thermal cycling, and interconnect-to-interconnect contact resistance can maintained as low as 10 mΩ/cm, or even as low as 4 mΩ/cm or even 1 mΩ/cm, even throughout and after thermal cycling representative of fuel cell operating conditions.

While interconnects employing the materials and methods of the present invention may find application in other solid oxide fuel cell architectures or even in other types of fuel cells, the interconnects of the present invention are particularly intended for use within a fuel cell design employing the electrolyte-supported multi-cell electrolyte sheet(s) 15 shown in the figures discussed above. As may be appreciated from FIG. 3, interconnects in such devices are generally required to pass through seals, such as glass-frit based seals, but do not to form the sealed chamber itself, and do not contact the electrolyte (or current collector or bus bar positioned thereon) over a large fraction of the sheet 15. Accordingly, for the principal intended application to solid oxide fuel cells with multiple-cell electrolyte sheets, CTE matching to seal materials may be more critical than CTE matching to electrolyte materials. For application in other solid oxide fuel cell architectures, alloys with CTE matched closely to the electrolyte may be preferred.

As an additional aspect of the present invention, active braze filler materials have also been found to capable of forming a high-performance seal between the fuel cell module frames and their associated electrolyte sheets. Such a seal may desirably be employed, for example, between frame 30 and its associated electrolyte sheet 15 (rear-most in FIG. 2) and between the frame 32 and its associated electrolyte sheet 15 (middle in FIG. 2). Frames 30 and 32 are desirably formed of a suitable high-temperature metal such as Austenitic, Ferritic or Martensetic steels, or Nickel- or Cobalt-based alloys, selected so as to match or closely approach the thermal expansion of the electrolyte. 446 Stainless Steel has been employed with success, for example. Brazed joints between such metal frames and electrolyte sheets have produced gas-tight seals resistant corrosion and oxidation and capable of withstanding thermal cycling.

Example I

Strip-form interconnect structures were formed of Aluchrom YHf (Krupp VDM, Werdohl Germany) and subjected to rapid thermal cycling from 200 to 800° C. for 200 hours in both reducing and oxidizing atmospheres. A stable and dense oxide was formed on the structure, preventing any noticeable further oxidation, and preventing reduction of the material, even under rapid thermal cycling to 800° C. under either reducing or oxidizing atmosphere. Bulk resistivity at 800° C. is~145 $\mu\Omega$ cm. No apparent change in bulk electrical properties was caused by the thermal cycling in the reactive atmospheres.

Example II

Wire-form interconnect structures were formed of Aluchrom (Krupp VDM, Werdohl Germany) and subjected to rapid thermal cycling from 200 to 800° C. for 200 hours in both reducing and oxidizing atmospheres. A stable and dense oxide was formed on the structure, preventing any noticeable further oxidation, and preventing reduction of the material, even under rapid thermal cycling to 800° C. under either reducing or oxidizing atmosphere. Resistivity at 25° C. was measured at 138 $\mu\Omega$ cm. Thermal cycling in reactive atmospheres produced no apparent change in electrical properties.

Example III

Figure 4:
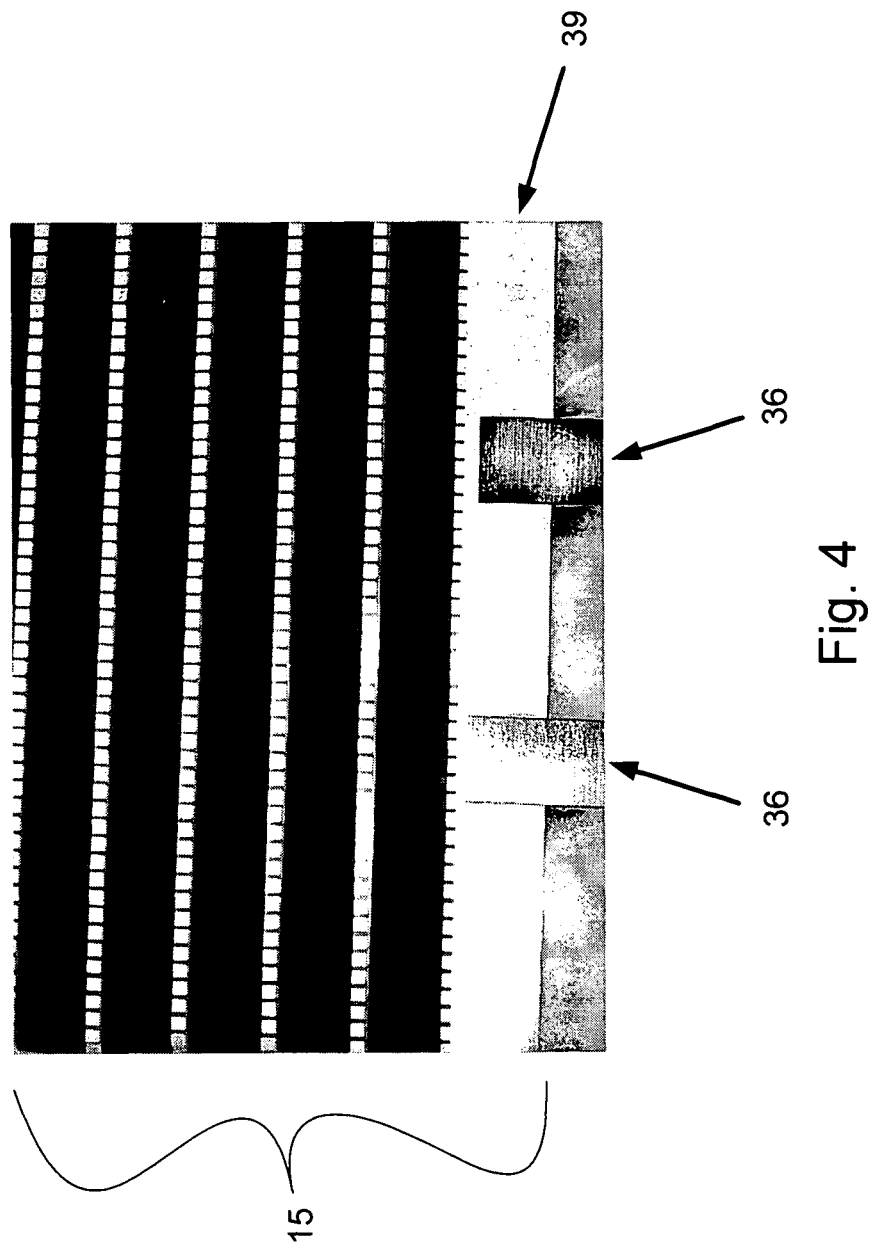
FIG. 4 is a digital image of an embodiment of structures according to the present invention.

Strip-form interconnect structures formed of Aluchrom YHf were brazed to a silver-palladium bus bar or current collector positioned on zirconia-based electrolyte. A digital image of the resulting structure, showing interconnect structures 36 and a bus bar/current collector 39 positioned on an electrolyte sheet 15 is shown in FIG. 4.

An active braze composition was employed, known as Tini-67™ foil (Wesgo Metals, Hayward, Calif.), a clad-laminated alloy that consists of a sandwich of a 12 µm Ni foil between two 19 µm Ti foils. The pieces to be joined were sandwiched with braze filler material in between and placed under a compression load so that intimate contact of the materials was achieved. The resulting assembly was then put into a vacuum furnace capable of attaining 10e-5 torr. The furnace was evacuated to about 10e-5 torr and then ramped at 5 C/minute to 950° C., held at that temperature for one hour, then slowly cooled to room temperature. Rapid thermal cycling for 100 hours produced no delamination. Four-probe resistivity measurements were taken, showing post-thermal cycling contact resistance as low as 8 m$\Omega$ over a junction area of about 1 cm$^2$. Interconnect structures were also brazed directly to the electrolyte material and likewise showed no delamination after 100 hours thermal cycling, indicating sufficiently close CTE match for structural durability.

Example IV

Strip-form interconnect structures formed of Aluchrom YHf were brazed to each other employing Tini-67™ foil. The pieces to be joined were sandwiched with the braze filler material in between and placed under a compression load so that intimate contact of the materials was achieved. The resulting assembly was then put into a vacuum furnace capable of attaining 10e-5 torr. The furnace was evacuated to about 10e-5 torr and then ramped at 5 C/minute to 1020° C., held at that temperature four one hour, then slowly cooled to room temperature. Four-probe resistivity measurements were taken showing contact resistances of only 2-4 m$\Omega$, even after thermal cycling, over a junction area of about 1 cm$^2$.

Example V

Strip-form interconnect structures formed of Aluchrom YHf were brazed to each other employing Silver-ABA® (Wesgo Metals, Hayward, Calif.) (92.75 Ag, 5 Cu, 1.0 Al, 1.25 Ti). The pieces to be joined were sandwiched with the braze filler material in between and placed under a compression load so that intimate contact of the materials was achieved. The resulting assembly was then put into a vacuum furnace capable of attaining 10e-5 torr. The furnace was evacuated to about 10e-5 torr and then ramped at 5 C/minute to 1020° C., held at that temperature four one hour, then slowly cooled to room temperature. Four-probe resistivity measurements were taken showing contact resistances of only ~1 m$\Omega$, even after thermal cycling, over a junction area of about 1 cm$^2$.

Example VI

Wire-form interconnect structures were formed of Aluchrom Y and a glass frit sealing material was adhered thereto. Rapid thermal cycling was performed from 125 to 800° C. under both oxidizing and reducing conditions. No damage or significant change to the wire itself or to the adhered glass sealing material was detected, indicating CTE and chemical compatibility under fuel cell operating conditions.

Comparative Example I

In contrast to Example VI above, a copper-nickel alloy was used to form a wire-form interconnect structure. A glass frit sealing material was adhered thereto, and rapid thermal cycling was performed from 125 to 800° C. under both oxidizing and reducing conditions. Significant damage was observed both to the wire itself and to the adhered glass frit sealing material, indicating a lack of CTE and/or chemical compatibility under fuel cell operating conditions.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An interconnect for a solid oxide fuel cell, the interconnect comprising:
    a high-temperature aluminum-containing surface-alumina-forming steel structure;
    a second structure to which the high-temperature aluminum-containing surface-alumina-forming steel structure is electrically connected; and
    a brazed gas-tight seal comprising an active braze filler material formed between and in direct contact with each of the high-temperature aluminum-containing surface-alumina-forming steel structure and the second structure, wherein the active braze filler material comprises a clad-laminated alloy wherein the clad-laminated alloy consists of a sandwich of nickel foil between two titanium foils, and the high-temperature aluminum-containing surface-alumina-forming steel structure is a metal frame, the second structure is a current collector or bus bar positioned on an electrolyte sheet and any alumina layer has been removed from a surface portion of the steel structure where an electrical contact is to be formed.

2. The interconnect of claim 1 wherein the second structure is also a high-temperature aluminum-containing surface-alumina-forming steel structure.

3. The interconnect of claim 1 wherein the current collector or bus bar comprises silver and palladium.

4. A fuel cell device comprising
    fuel cell modules including multi-cell electrolyte sheets; and
    interconnect structures electrically interconnecting the fuel cell modules, wherein the interconnect structures are formed of a high-temperature aluminum-containing surface-alumina-forming steel, a structure to which the high-temperature aluminum-containing surface-alumina-forming steel structure is electrically connected, and a brazed gas-tight seal comprising an active braze filler material formed between and in direct contact with each of the high-temperature aluminum-containing surface-alumina-forming steel structure and the structure, wherein the active braze filler material comprises a clad-laminated alloy wherein the clad-laminated alloy consists of a sandwich of nickel foil between two titanium foils, and the high-temperature aluminum-containing surface-alumina-forming steel structure is a metal frame, the second structure is a current collector or bus bar positioned on one of the electrolyte sheets and any alumina layer has been removed from a surface portion of the steel structure where an electrical contact is to be formed.

5. The fuel cell device of claim 4 wherein the interconnect structures include a steel-to-steel brazed joint having a post-thermal cycling contact resistance per square centimeter of less than or equal to 10 m$\Omega$, where thermal cycling is thermal cycling to at least 800° C. plus or minus 200° C.

6. The fuel cell device of claim 5 wherein the interconnect structures include a steel-to-steel brazed joint having a post-thermal cycling contact resistance per square centimeter of less than or equal to 4 m$\Omega$.

7. The fuel cell device of claim 6 wherein the interconnect structures include a steel-to-steel brazed joint having a post-thermal cycling contact resistance per square centimeter of less than or equal to 1 m$\Omega$.

8. The fuel cell device of claim 4 wherein said brazed joint between high-temperature aluminum-containing surface-alumina-forming steel structure and said structure has a post-thermal cycling contact resistance per square centimeter of less than or equal to 218 m$\Omega$, where thermal cycling is thermal cycling to at least 800° C. plus or minus 200° C.

9. The interconnect of claim 1 wherein the high-temperature aluminum-containing surface-alumina-forming steel comprises 0.1 to 10% aluminum.

* * * * *